United States Patent [19]

Asterö

[11] 4,339,175
[45] Jul. 13, 1982

[54] PROJECTION SCREEN

[75] Inventor: Ulf J. E. Asterö, Tumba, Sweden

[73] Assignee: Asthausbolagen HB Asterö & Stockhaus, Tumba, Sweden

[21] Appl. No.: 170,971

[22] Filed: Jul. 18, 1980

[51] Int. Cl.³ ............................................. C03B 21/56
[52] U.S. Cl. ..................................... 350/125; 350/117
[58] Field of Search ................................ 350/117, 125

[56] References Cited

U.S. PATENT DOCUMENTS

| 2,753,818 | 7/1956 | Green | 350/125 X |
| 3,720,455 | 3/1973 | Sahlin | 350/117 |
| 3,998,522 | 12/1976 | Holzel | 350/125 |
| 4,022,522 | 5/1977 | Rain | 350/125 X |

FOREIGN PATENT DOCUMENTS

| 2307880 | 5/1974 | Fed. Rep. of Germany | 350/117 |
| 112065 | 10/1944 | Sweden | 350/125 |
| 805216 | 12/1958 | United Kingdom | 350/117 |

*Primary Examiner*—Richard A. Wintercorn
*Attorney, Agent, or Firm*—Burns, Doane, Swecker & Mathis

[57] ABSTRACT

A projection screen is formed of a rectangular, tubular, annular frame of flexible material, a projection sheet of flexible material covering one side of the frame and a foil of flexible material covering the opposite side of the frame. A valve is connected to the frame and another valve is connected to the compartment defined by the inner side of the frame, the foil and the sheet. The projection screen device is thus completely collapsible. In order to put the screen into operative condition, the frame is inflated to a stiff condition, and a subatmospheric pressure is established in said compartment, whereby to bring the sheet, and possibly also the foil, to take a concave, substantially spherical shape. Also the foil can constitute a projection screen surface, possibly with another curvature than the sheet.

7 Claims, 7 Drawing Figures

PROJECTION SCREEN

TECHNICAL FIELD

The invention refers to a projection screen comprising a flexible projection sheet which forms a boundary surface of a closed container comprising a frame arranged to hold the projection sheet distended, the central portions of the projection sheet being arranged at a distance from the other boundary surfaces of the container in the distended condition of the projection sheet, and means arranged to permit establishment of a subatmospheric pressure within the container, whereby the central portions of the sheet freely may be sucked in towards the interior of the container so that the image surface of the projection sheet takes a concave, substantially spherical shape.

BACKGROUND OF THE INVENTION

From Swedish Pat. No. 112 065 and the DE OS No. 26 45 141 there is previously known a projection screen structure comprising a rigid open box, the open side of which is closed by means of a flexible sheet which serves as a projection screen surface. By establishing a subatmospheric pressure within the box, the sheet is imparted a concave spherical shape.

Such structures, as well as concave spherical stiff projection boards are, however, bulky and not readily transportable from one place to another, especially when the effective screen surface thereof is to have dimensions of 1.5 by 2 meters or more.

OBJECT OF THE INVENTION

An object of the invention is, therefore, to provide a completely collapsible and inflatable projection screen device, whereby the device readily can be inflated and folded or rolled into a small package which is easy to stow away or transport from one place to another, despite a relatively large projection surface area.

Another object of the invention is to provide a device of said type which easily can be made with two different projection surfaces which, if desired, can be designed to be imparted different radius of curvature in the distended condition of the device and/or to have different reflecting coatings on the two surfaces.

SUMMARY OF THE INVENTION

The inventive projection screen device is of the type comprising a flexible projection sheet which forms a boundary surface of a closed container comprising a frame arranged to hold the projection sheet distended, the central portions of the projection sheet being arranged at a distance from the other boundary surfaces of the container in the distended condition of the sheet, and means arranged to permit establishment of a subatmospheric pressure within the container, whereby the central portions of the projection sheet freely may be sucked in towards the interior of the container so that the image surface of the projection sheet takes a concave, substantially spherical, shape. The inventive improvements reside therein that the container comprises the frame, the projection sheet and a flexible foil which is arranged substantially in parallel with the projection sheet, the frame being arranged to hold the sheet at a distance from the foil, and that the frame comprises a closed tube of a flexible material and means for permitting inflation of the frame, whereby the frame can be pressurized to be stiffened and hold the sheet distended.

The projection sheet may be connected to the frame along a line which substantially corresponds to an intersection between the inside of the closed frame and a spherical surface.

The means for establishing a subatmospheric pressure in the container may comprise a valve connected to the container.

The means for inflating the frame may consist of a valve connected to the frame.

The frame may be arranged to form a shade which ajoins the rim area of the projection sheet in order to prevent stray light from falling onto the projection surface, said shade being arranged along at least part of the periphery of the sheet.

The foil may constitute a projection surface.

The foil may be arranged, in the operative condition of the projection screen device, to take a concave, substantially spherical, shape, having another radius than the concave shape of the sheet. The stray light shades may have a shape of screens connected to the frame.

The invention, which is also defined in the appended claims, fulfills the above mentioned objects.

In the following, examples on embodiments of the invention will be closer described with reference to the appended drawings.

DETAILED DESCRIPTION OF THE PREFERRED EMBODIMENTS

Figure 1:
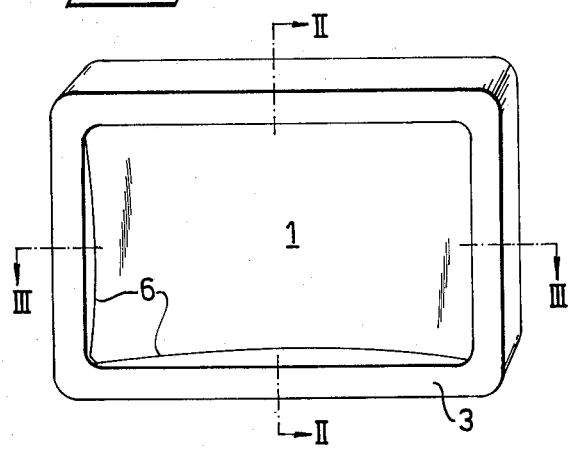
FIG. 1 is an isometric view of a projection screen device according to the invention.
Figure 2:
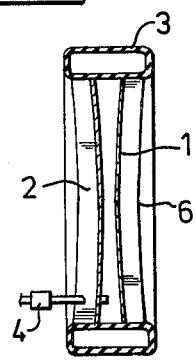
FIG. 2 is a section taken along line II—II in FIG. 1.
Figure 3:
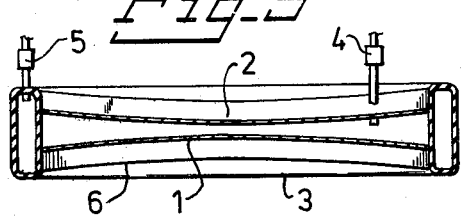
FIG. 3 is a section taken along line III—III in FIG. 1.

With reference to FIGS. 1–3, a closed rectangular frame 3 of a flexible material is inflatable via a valve 5, whereby it can be stiffened and take the shape shown in FIG. 1. A flexible projection sheet 1 is connected to the inside of the frame 3 along a line 6, which preferably substantially corresponds to an intersection between the inside of frame 3 and a spherical surface. A flexible foil 2 is also connected to the inside of the frame substantially in parallel with the projection sheet 1. The flexible foil 2 can also be connected to the inside of the frame 3 along a line that preferably and substantially corresponds to an intersection between the inside of the inflated frame and a spherical surface. A valve 4 is connected to the compartment defined by the projection sheet 1, the foil 2 and the inside of frame 3. Valve 4 permits establishment of the subatmospheric pressure in said compartment whereby the projection sheet 1 and the foil 2 can take a spherical shape when the frame 3 is inflated.

Figure 4:
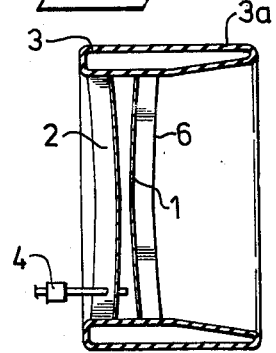
FIGS. 4 and 5 are sections corresponding to FIG. 2 and FIG. 3, respectively, of a variant of the embodiment according to FIG. 1.
Figure 5:
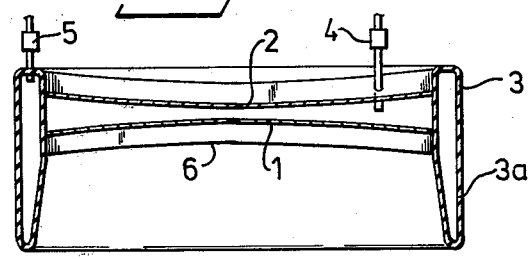

The embodiment according to FIGS. 4 and 5 differs from the one according to FIGS. 1–3 therein, that the inflatable frame 3 is elongated in a normal direction to the surface of the projection sheet 1 in order to form a stray light shade 3a. The shade can extend around the entire periphery of the projection screen.

Figure 7:
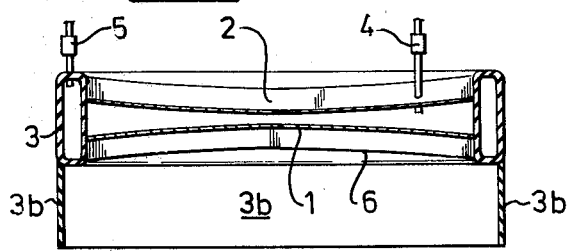
FIGS. 6 and 7 are sections corresponding to FIG. 2 and 3, respectively, of an alternative variant of the embodiment according to FIG. 1.
Figure 6:
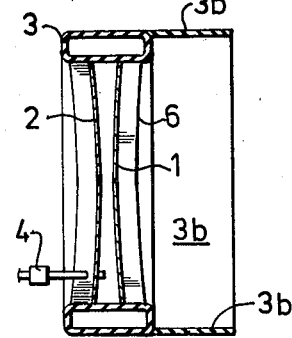

The embodiment according to FIGS. 6 and 7 correspond substantially to the embodiments according to FIGS. 1–3, but the difference resides therein that flexible shades 3b are connected to the frame 3 in order to extend in the normal direction to the projection sheet 1 in the distended condition of the projection screen. Thus, the shades 3b constitute an alternative to the elongations 3a of the frame shwon in FIGS. 4 and 5.

The described and illustrated embodiments of the inventive projection screen are thus entirely made out of a flexible material, whereby they can be entirely folded, collapsed or rolled up when the valves 4 and 5, respectively, have been opened. Hereby the projection screen device will require only a very small space for transport and storage.

In order to bring the projection screen into operative condition, it is only necessary to inflate the frame 3 via the corresponding valve 5 and then to evacuate the compartment defined by the inside of frame 3, the sheet 1 and the foil 2, whereby at least the projection sheet 1 takes the desired concave, preferably spherical shape. Moreover in the embodiments according to FIGS. 4 and 5 and FIGS. 6 and 7, the shades 3a and 3b, respectively, will automatically be pitched when the frame 3 is infalted to distended condition.

It should, however, be noted that the inventive device can be modified in several aspects. Thus, the foil 2 could be connected to the frame 3 in any desired way, as the foil 2 primarily only serves to define a boundary surface of the compartment, the evacuation of which permits the projection sheet 1 to take the desired spherical or curved shape. It can, of course, be suitable to design the foil 2 in correspondance to sheet 1, whereby also the foil can serve as a projection surface. In connection herewith it may also be suitable to connect the foil 2 to the frame in the way stated in connection to the embodiment according to FIGS. 1–3, whereby both the major surfaces of the projection screen device take the desired shape. It can then be desirable to design the connection of the foil 2 to the inside of frame 3, and the flexibility of the foil 2 in such a way that the foil 2 is imparted a radius of curvature which differs from the radius of curvature of sheet 1, in the raised condition of the screen device. At a projection, one can then choose that side of the screen device the curvature of radius of which is best suited for the actual distance between projector and the screen device, and the distance between the screen device and the audience, respectively.

Furthermore it is, of course, possible to vary the subatmospheric pressure in the compartment between foil 2, frame 3 and sheet 1 in order to adapt their radius of curvature to the actual projection conditions.

Moreover it should be noted that the sheet 1, and also the foil 2, could be connected to the frame along a line which substantially corresponds to an intersection between the inside of frame 3 and a plane, in which case the sheet 1 and the foil 2 may take the desired curved shape under influence of the subatmospheric pressure and thanks to the elasticity of the sheet and of the foil, or the elasticity of the frame.

The subatmospheric pressure in the compartment may be established by closing the valve 4 before the frame 3 is fully pressurized and fully extended. As the frame 3 then is fully inflated and expanded, the frame will tend to enlarge the compartment volume, but the amount of air enclosed therein is less than the volume to which the frame tends to expand the compartment; thus a subatmospheric pressure is established in the compartment, whereby the sheet and possibly also the foil takes the desired concave shape.

The sheet and the foil may be provided with different reflective coatings so as to make the device useful in different illuminated environments. Thus the sheet may be made for so called day light projection, whereas the foil may be made for projection in a darkened room.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in claims be embraced thereby.

What is claimed is:

1. A projection screen comprising a flexible projection sheet which forms a boundary surface of a closed container comprising a frame arranged to hold the projection sheet distended, central portions of the projection sheet being arranged at a distance from the other boundary surfaces of the container in the distended condition of the sheet, means for establishing a subatmospheric pressure in the container such that the central portions of the projection sheet freely may be sucked in towards the interior of the container so that an image surface of the projection sheet takes a concave, substantially spherical shape, the container further comprises a flexible foil which is arranged substantially in parallel with the projection sheet, said foil constitutes a projection surface, the frame being arranged to hold the sheet at a distance from the foil, and the frame includes a closed annular tube of flexible material and means for permitting inflation of the frame such that the frame can be pressurized to be stiffened and hold both the sheet and the foil distended.

2. The projection screen according to claim 1, wherein the projection sheet is connected to the frame along a line which substantially corresponds to an intersection between the inner wall of the frame and a spherical surface.

3. The projection screen according to claim 1, wherein said means for establishing a subatmospheric pressure in the container includes a valve connected to the container.

4. The projection screen according to claim 1, wherein said means for inflating the frame includes a valve connected to the frame.

5. The projection screen according to claim 1, wherein the frame is arranged to form a stray light shade adjoining a rim area of the projection sheet along at least part of the periphery of the sheet.

6. The projection screen according to claim 1, wherein in the operative condition of the projection screen when the frame is inflated, the foil is arranged to take a concave, substantially spherical shape, which deviates from the shape of the sheet.

7. The projection screen according to claim 5, wherein the frame is provided with strips which form the stray light shade.

* * * * *